D. W. DUNN.
MECHANICAL TOY.
APPLICATION FILED JULY 21, 1915.

1,189,433.

Patented July 4, 1916.
3 SHEETS—SHEET 1.

Witnesses

D. W. Dunn  Inventor by

Attorneys

D. W. DUNN.
MECHANICAL TOY.
APPLICATION FILED JULY 21, 1915.
1,189,433.
Patented July 4, 1916.
3 SHEETS—SHEET 2.
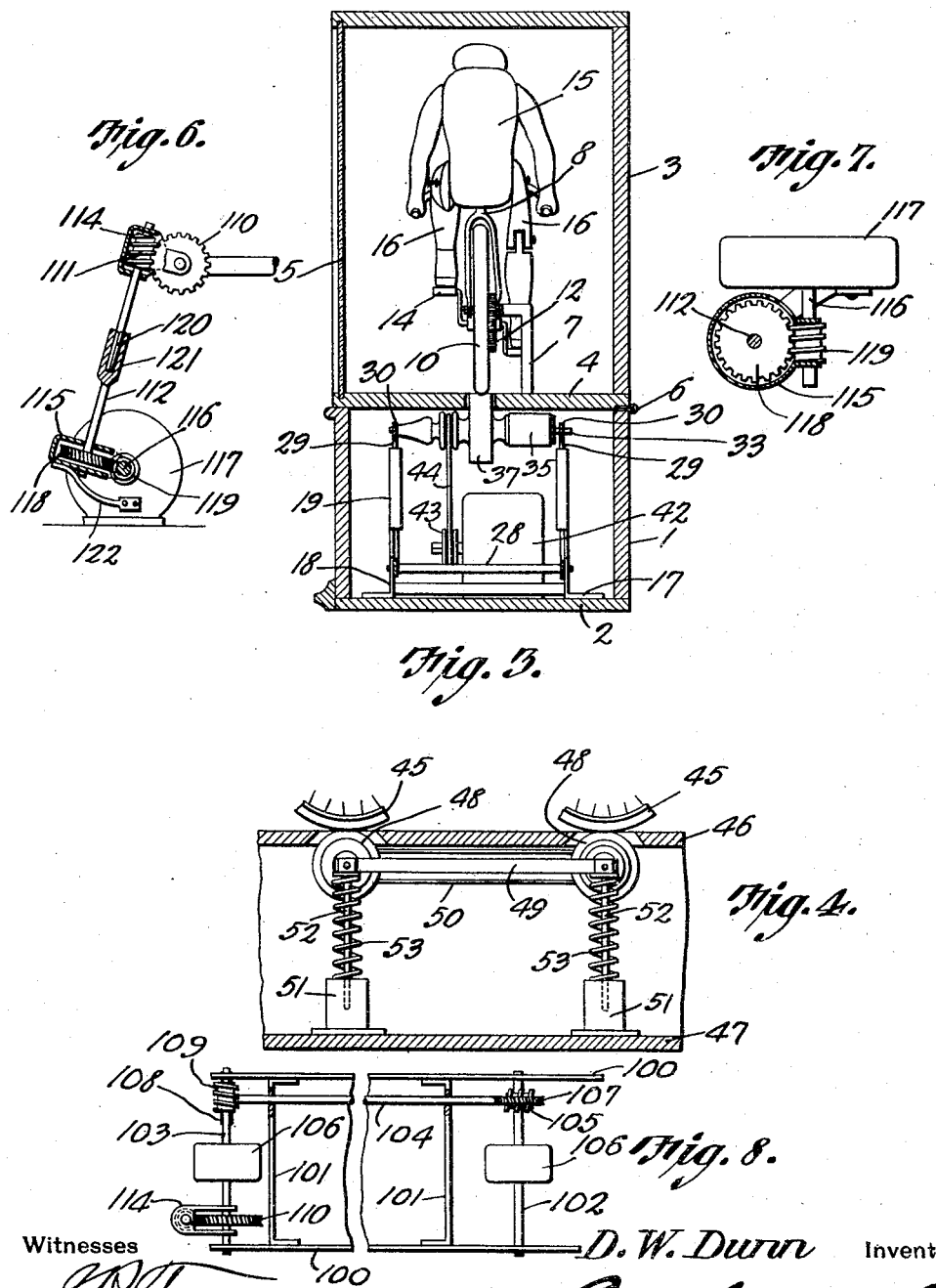

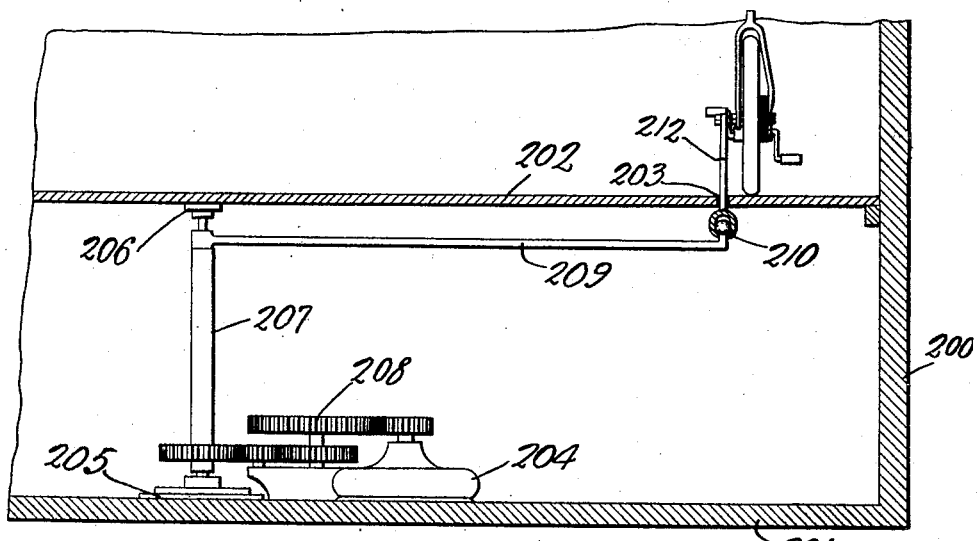
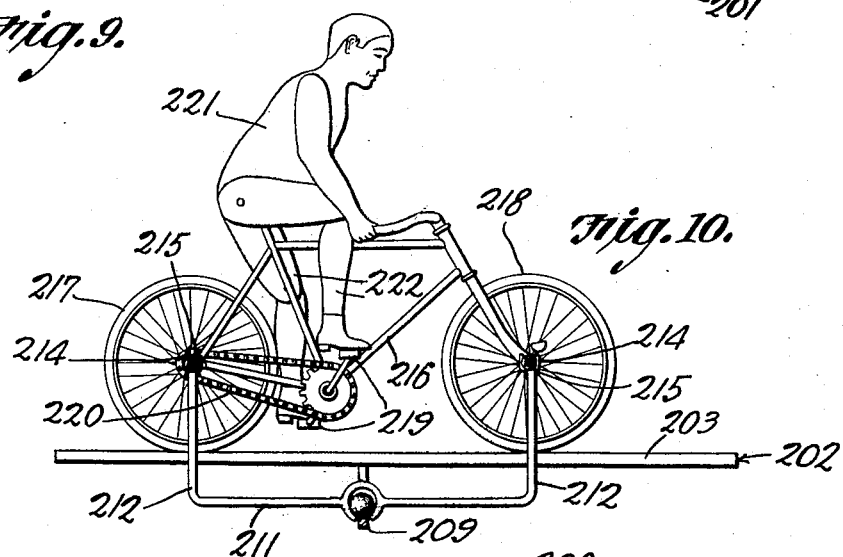
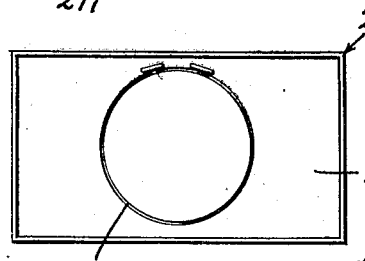

UNITED STATES PATENT OFFICE.

DAVID W. DUNN, OF ASHLAND, KENTUCKY.

MECHANICAL TOY.

1,189,433.  Specification of Letters Patent.  Patented July 4, 1916.

Application filed July 21, 1915. Serial No. 41,194.

*To all whom it may concern:*

Be it known that I, DAVID W. DUNN, a citizen of the United States, residing at Ashland, in the county of Boyd and State of Kentucky, have invented a new and useful Mechanical Toy, of which the following is a specification.

The device forming the subject matter of this application is an advertising or display structure in the nature of a mechanical toy.

In the present invention, a figure is seated on a bicycle and, when the wheels of the bicycle are rotated, the legs of the figure move, as though the figure were propelling the bicycle, the bicycle, however, being fixed, and novel means being provided for rotating the bicycle wheels.

Specifically, the invention aims to provide novel means for rotating the bicycle wheels.

Another object of the invention is to provide a means whereby the wheels of the bicycle may be operatively connected with the driving mechanism therefor.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

Figure 1:
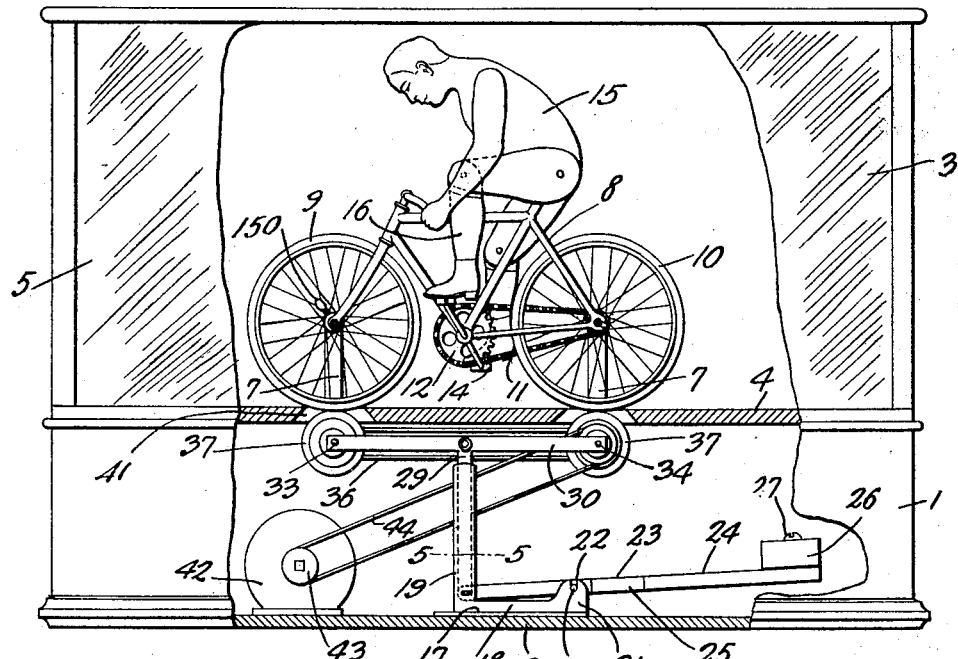
Figure 2:
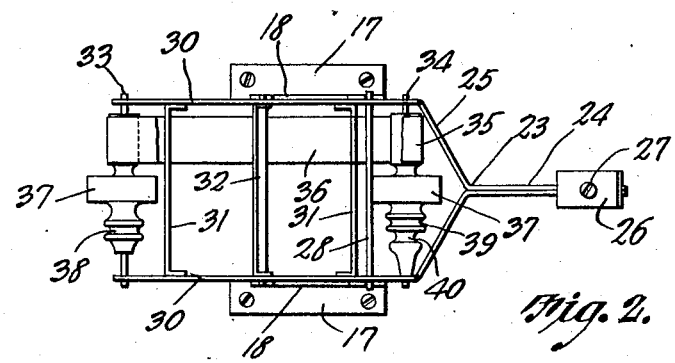
Figure 5:
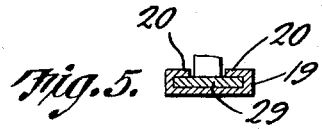

In the accompanying drawings:—Figure 1 shows the invention in front elevation, parts being broken away; Fig. 2 is a top plan of the driving mechanism whereby the bicycle wheels are propelled; Fig. 3 is a vertical transverse section; Fig. 4 is a fragmental vertical longitudinal section showing a slight modification; Fig. 5 is a fragmental horizontal section on the line 5—5 of Fig. 1; Fig. 6 is a vertical sectional detail showing a modified means whereby a driving connection may be established with the motor; Fig. 7 is a fragmental horizontal section of the structure shown in Fig. 6; Fig. 8 is a top plan of the frame wherewith the motor connection of Figs. 6 and 7 coöperates, parts being broken away; Fig. 9 is a fragmental transverse section showing a modified form of the invention; Fig. 10 is a sectional detail showing a portion of the structure shown in Fig. 9; Fig. 11 is a top plan of that form of the invention which is shown in Figs. 10 and 9, Fig. 11 being diagrammatic in nature.

In carrying out the present invention there is provided a support which is a composite structure, the same including a box-like base 1, open at the top and including a bottom 2. The support includes a box-like casing or frame 3, open at the front and embodying a platform 4. Across the front of the casing 3 extends a transparent plate 5. The platform 4 of the casing 3 is pivotally connected with the rear wall of the base 1 by means of hinges 6, one of which is shown in Fig. 3. Fixed to the platform 4 are standards 7 supporting a bicycle frame 8 on which is journaled for rotation a front wheel 9 and a rear wheel 10. A sprocket chain 11 forms an operative connection between the rear wheel 10 and a sprocket wheel 12 journaled on the bicycle frame, the sprocket wheel 12 being operatively connected with pedals 14. Seated on the frame 8 is a figure 15 comprising movable legs 16, the feet of which rest upon the pedals 14 and preferably are secured thereto.

The actuating mechanism for driving the bicycle wheels 9 and 10 embodies a frame including foot plates 17 secured to the bottom 2 of the base 1, the foot plates having upstanding flanges 18 and upwardly projecting standards 19 provided in their inner faces as clearly shown in Fig. 5 with guides 20. Ears 21 upstand from the flanges 18, the ears 21 being provided with notches 22.

The invention comprises a lever 23 embodying a stem 24 and spaced arms 25, the stem carrying a weight 26 held in place by a securing device such as a set screw 27. Connecting the arms 25 of the lever and extended laterally therebeyond is a fulcrum rod 28, the ends of which are pivotally received in the notches 22 of the ears 21. The extremities of the arms 25 of the lever are loosely connected with supports 29 mounted to reciprocate vertically in the guides 20 of the standards 19. A frame is provided, the same including side bars 30, and ties 31 connecting the side bars. Intermediate their ends, the side bars 30 are connected by a pivot rod 32 mounted in the upper ends of the standards 29. Shafts 33 and 34 are journaled in the side bars 30 near to their ends. Pulleys 35 are secured to the shafts 33 and 34 and about the pulleys is trained a belt 36 whereby the shafts are operatively connected. The shafts 33 and 34 carry wheels 37 adapted to coact respectively with the wheels 9 and 10 of the bicycle, the platform 4 being provided with openings 41 which makes an operative connection between these elements possible, as Fig. 1 will most clearly disclose. The shaft 33 carries a pulley 38 and pulleys 39 and 40 constitute a part of the shaft 34. Mounted in the base 1 and ordinarily supported on the bottom 2 thereof is a motor 42 of any desired sort embodying a pulley 43 about which is trained a belt 44. By substituting belts, it is possible to couple up the motor either with the pulley 38 or with the pulleys 39 and 40 thereby to drive the mechanism at different speeds.

In practical operation, the weight 26 tilts the lever 24 on its fulcrum 22 and elevates the standards 29 and the frame including the side bars 30, so that the wheels 37 are pressed yieldingly against the wheels 9 and 10 of the bicycle. Motion is transmitted from the motor 42 by means of the belt 44 to one of the shafts 33 or 34, and by means of the belt 36, the driving shaft of the pair 33—34 transmit motion to the driven shaft of such pair. The wheels 37 are rotated, and the wheels 37, contacting with the wheels 9 and 10 of the bicycle cause the said bicycle wheels to rotate. The wheel 10 through the medium of the sprocket chain 11, the sprocket wheel 12 causes the pivoted legs 16 of the figure 15 to operate with a lifelike action. Owing to the presence of the counter-weighted lever 24, the wheels 37 are always pressed yieldingly against the wheels 9 and 10 of the bicycle, the frame comprising side bars 30 being pivotally connected with the upper ends of the supports 39, so as to coöperate properly with both wheels of the bicycle.

When it is desired to adjust the driving mechanism, the casing or frame 6 may be swung rearwardly upon its hinges 6, thus disclosing the driving mechanism and attendant parts. When it is desired to start the figure 15 in operation, the casing 3 may be swung forwardly into a vertical position, and by this operation, the wheels 9 and 10 of the bicycle will be carried downwardly onto the driving wheels 37, the lever 24 and the weight 26 constituting a means, as hereinbefore stated, for holding the driving wheels 37 in operative relation to the bicycle wheels.

The modification shown in Fig. 4 will render it evident that the lever 24 may be dispensed with if desired. In Fig. 4, the bicycle wheels are shown at 45, the platform appears at 46, the bottom of the base being shown at 47, the numeral 48 indicates the driving wheels, at 49 appears the frame on which the wheels 48 are journaled, the shafts being operatively connected by a belt 50, Figs. 2 and 1 being referred to for a disclosure of the specific means whereby the driving wheels are operatively connected with the motor. On the bottom 47 may be mounted sockets 51 in which are mounted for vertical reciprocation, supports 52 pivoted at their upper ends to the frame 49. Compression springs 43 abut at their lower ends against the sockets 51 and at their upper ends abut against the frame 49 so as to elevate the frame and to cause the driving wheels 48 to maintain an operative engagement with the bicycle wheels 45.

With the axle of the front wheel 9 may be operatively assembled a cyclometer 150, the function of which is to indicate the number of times which the wheel 9 has been rotated.

Although a bicycle and a rider have been embodied in the present disclosure, it will be understood that a vehicle of any desired sort may be mounted in place of the bicycle, the rider being omitted if desired. Neither is it necessary that a two-wheeled structure be used.

One purpose to which the present invention may be put is that the same may be used as a chance device if desired, prospective purchasers at a store being permitted to make guesses as to the number of times which the wheels will rotate during a given period.

In the modified form of the invention shown in Figs. 6, 7 and 8, the side bars of the frame appear at 100 and correspond to the bars 30, the ties being indicated at 101 and corresponding to the ties 31. In the side bars 100 are journaled a shaft 102 and a shaft 103, the shafts carrying wheels 106 corresponding to the wheels 37. Extended longitudinally of the frame and journaled in the ties 101 is a shaft 104, one end of which is provided with a worm 105 meshing into a worm wheel 107 on the shaft 102. The shaft 104 carries a worm wheel 108 meshing into a worm 109 on the shaft 103. The shaft 103 carries a worm wheel 110 meshing into a worm 111 on an upright shaft 112. A yoke 114 is pivoted on the shaft 103 and the shaft 112 is journaled in the yoke, the yoke constituting a means for holding the worm 111 in mesh with the worm wheel 110. The lower end of the shaft 112 carries a worm wheel 118 meshing into the worm 119 on the shaft 116 of the motor 117, the yoke 115 being pivoted on the motor shaft 116 and constituting a means for holding the worm wheel 118 in mesh with the worm 119. The shaft 112 preferably comprises telescoped parts, one of which is squared as shown at 120 to slide in the socket 121 on the other part of the shaft 112, the construction being such that the constituent parts of the shaft 112 are united for simultaneous rotation, although relative longitudinal movement between the said parts of the shaft is possible. The yoke 115 is upheld yieldingly by means of a spring arm 122 secured to the casing of the motor 117 and bearing against the under portion of the yoke. By means of the construction above outlined, motion may be transmitted from the motor shaft 116 to the wheels 106, the construction under consideration dispensing with the belt 44 and the belt 36, the structure delineated in Figs. 1 and 2 remaining otherwise unaltered. Noting the shaft 112, comprising telescoping parts, together with the spring 122 it will be obvious that the frame comprising the side bars 100 may be raised and lowered through the instrumentality of the lever 24 and the weight 26.

In Figs. 9, 10 and 11 of the drawings, a modified form of the invention is shown, wherein the vehicle, in the form of a bicycle is adapted to move in a circle or orbit.

Referring to the figures above enumerated, the numeral 200 indicates a box-like casing embodying a bottom 201 and a top 202, the top being provided with a circular slot 203. Secured to the bottom 201 of the casing, or otherwise supported is a motor 204 of any desired type. On the bottom 201 there is a bearing 205 disposed below a bearing 206 secured to the top 202. In the bearings 205 and 206 is journaled for rotation a shaft 207 united by means of a gear train 208 with the shaft of the motor 204. Secured to the upright shaft 207 and projecting laterally therefrom is an arm 209, united by means of a ball and socket joint 210 or other suitable connection, with the intermediate portion of a frame 211 embodying upright arms 212 passing outwardly through the slot 203 in the stop 202 of the casing. The upper ends of the arms 212 are forked as shown at 214 or are otherwise adapted to receive the ends of axles 215, supported by a bicycle frame 216. On the axles 215 are journaled, respectively, a rear wheel 217 and a front wheel 218. The bicycle frame 216 carries pedals 219, operatively united by means of a connection 220 of any desired sort with the rear wheel 217. Seated upon the bicycle frame 216 is a rider 221 embodying jointed legs 222 secured to the pedals 219.

In practical operation, motion is transmitted from the motor 204 to the shaft 207 through the instrumentality of the gear train 208, the radius arm 209 being actuated, and the latter carrying with it the frame 211 and the bicycle frame 216. Owing to the presence of the ball and socket joint 210 or any other suitable structure, the wheels 218 and 217 of the bicycle are at all times in frictional engagement with the top 202 of the casing, which constitutes a track. The wheels of the bicycle, therefore, are rotated as the bicycle moves in an orbit and from the rear wheel 217 motion is transmitted to the pedals 219 by means of the connection 220. When the pedals are actuated, the jointed legs 222 of the rider 221 will move, and thus the rider will be given a life-like appearance, as the bicycle moves around in an orbit.

Having thus described the invention, what is claimed is:—

1. In a device of the class described, a support; a bicycle frame held thereby against progressive movement; wheels journaled on the bicycle frame; a pedal carried by the bicycle frame; an operative connection between one bicycle wheel and the pedal; a figure seated on the bicycle and including a movable leg engaging the pedal; and a driving mechanism including a rotatable element engaging that bicycle wheel which is operatively connected with the pedal.

2. In a device of the class described, a support; a bicycle frame upheld thereby; a wheel journaled on the bicycle frame; a pedal carried by the bicycle frame; an operative connection between the wheel and the pedal; a figure seated on the bicycle frame and including a movable leg coöperating with the pedal; a frame; a rotatable element on the frame and engaging the bicycle wheel; means for upholding the frame yieldingly, to cause the rotatable element to engage with the bicycle wheel; and means for driving the rotatable element.

3. In a device of the class described, a support comprising a base and a casing movable with respect to the base thereby to open the base; a bicycle frame mounted on the casing and including a rotatable wheel; a pedal on the bicycle frame, an operative connection between the pedal and the wheel; a figure seated on the bicycle frame and including a movable leg coacting with the pedal; a frame mounted in the base; a rotatable element carried by the last specified frame and coacting with the bicycle wheel; means for rotating the rotatable element; and means for supporting the last specified frame yieldingly whereby the rotatable element will coact with the bicycle wheel when the casing is disposed above the base.

4. In a device of the class described, a supporting structure; a guide carried thereby; a support mounted to reciprocate in the guide; a lever fulcrumed intermediate its ends on the supporting structure and provided at one end with a weight, the other end of the lever being pivotally connected with the support; a frame pivoted to the support; a rotatable element journaled on the frame; means for driving the rotatable element; a bicycle frame upheld by the supporting structure; a wheel journaled on the bicycle frame and engaged by the rotatable element; a figure seated on the bicycle frame and including a movable leg; a pedal carried by the bicycle frame and coacting with the movable leg; and an operative connection between the pedal and the wheel of the bicycle.

5. In a device of the class described, a support comprising a base and a casing movable with respect to the base, thereby to open the base; a vehicle frame mounted on the casing and including a rotatable wheel; a frame mounted in the base; a rotatable element carried by the last specified frame and coacting with the wheel; means for rotating the rotatable element; and means for supporting the last specified frame yieldingly whereby the rotatable element will coact with the wheel when the casing is disposed above the base.

6. In a device of the class described, a supporting structure; a guide carried thereby; a support mounted to reciprocate in the guide; a lever fulcrumed intermediate its ends on the supporting structure and provided at one end with a weight, the other end of the lever being pivotally assembled with the support; a frame pivoted to the support; a rotatable element journaled on the frame; means for driving the rotatable element; and a vehicle mounted on the supporting structure, the vehicle comprising a wheel engaged with the rotatable element.

7. In a device of the class described, a supporting structure; a vehicle frame carried thereby and including a rotatable wheel; a cyclometer operatively connected with the wheel; a frame mounted for movement on the supporting structure and including a rotatable element; means for driving the rotatable element; and yieldable means coacting with the last specified frame to hold the rotatable element in engagement with the wheel.

8. In a device of the class described, a bicycle frame; front and rear wheels journaled thereon; a pedal carried by the frame; an operative connection between the pedal and one wheel; a figure seated on the frame and including a jointed leg coacting with the pedal; and means contacting directly with both wheels and independent of the pedal for rotating both wheels, whereby the wheel wherewith the pedal is connected, will actuate the connection, the pedal and the leg of the figure.

9. In a device of the class described, a floor; a bicycle frame disposed above the floor; a pedal carried by the frame; front and rear wheels journaled on the frame; an operative connection between one wheel and the pedal; a figure seated on the frame and including a jointed leg operable by the pedal; a drive shaft located below the floor; and means coacting with the drive shaft and independent of the pedal for imparting rotation to both wheels with respect to the floor.

10. In a device of the class described, a floor; coöperating elements comprising a bicycle frame disposed above the floor and a wheel journaled on the bicycle frame; a pedal carried by the frame; a connection between the pedal and the wheel; a figure seated on the frame and including a jointed leg operable by the pedal; a second wheel journaled on the frame; a drive shaft located below the floor; and means coacting with the drive shaft and with one of said coöperating elements, and independent of the pedal, for imparting rotation to both wheels with respect to the floor.

In testimony that I claim the foregoing as my own, I have hereto affixed my signature in the presence of two witnesses.

DAVID W. DUNN.

Witnesses:
W. O. HOWARD,
T. C. LACY.